(12) United States Patent
Virtanen et al.

(10) Patent No.: US 11,795,614 B2
(45) Date of Patent: Oct. 24, 2023

(54) APPARATUS AND METHOD FOR DISPERSING OR REFINING OF ORGANIC MATERIAL, SUCH AS CELLULOSE FIBER AND ORGANIC WASTE

(71) Applicant: Cellwood Machinery AB, Nässjö (SE)

(72) Inventors: Stefan Virtanen, Nässjö (SE); Dan Rombo, Bodafors (SE); Tomas Anarp, Nässjö (SE)

(73) Assignee: Cellwood Machinery AB, Nassjo (SE)

( * ) Notice: Subject to any disclaimer, the term of this patent is extended or adjusted under 35 U.S.C. 154(b) by 528 days.

(21) Appl. No.: 16/901,525

(22) Filed: Jun. 15, 2020

(65) Prior Publication Data

US 2020/0399826 A1    Dec. 24, 2020

(30) Foreign Application Priority Data

Jun. 20, 2019    (EP) ..................................... 19181419

(51) Int. Cl.
*D21B 1/32*      (2006.01)
*D21C 5/02*      (2006.01)

(52) U.S. Cl.
CPC ................. *D21B 1/32* (2013.01); *D21C 5/02* (2013.01)

(58) Field of Classification Search
CPC .................................... D21B 1/32; D21C 5/02
USPC ............................................................ 162/5
See application file for complete search history.

(56) References Cited

U.S. PATENT DOCUMENTS

| 5,443,213 | A | * | 8/1995 | Aikawa | ..................... D21D 5/02 241/73 |
| 6,206,199 | B1 | * | 3/2001 | Kurtz | ..................... B29B 17/02 209/7 |
| 7,412,350 | B2 | * | 8/2008 | Fralic | ...................... D21D 1/20 702/183 |

FOREIGN PATENT DOCUMENTS

| FR | 2494734 | A1 | 5/1982 |
| WO | 8302788 | A1 | 8/1983 |

OTHER PUBLICATIONS

European Search Report (dated Nov. 29, 2019) for corresponding European App. 19181419.3.
Cellwood Machinery, Krima Disperser Type KD (Nov. 2014).

* cited by examiner

*Primary Examiner* — Jacob T Minskey
(74) *Attorney, Agent, or Firm* — WRB-IP PLLC

(57) ABSTRACT

An apparatus for dispersing or refining organic material includes a rotor shaft extending along a rotation axis, a rotor to be driven to rotate by the rotation axis, and a housing arranged around the rotor shaft and the rotor, the housing having an inlet for receiving the organic material and an outer wall. The housing has a stator disc, and the rotor has a rotor disc, each disc having teeth on a surface that is turned toward the other disc. After organic material has been dispersed by the teeth, the organic material is fed into a dilution zone where the organic material is mixed with dilution liquid introduced through a number of dilution inlets before the mix is fed out of the apparatus via an outlet arranged in the outer wall. The dilution inlets are angled in relation to the radial of the rotation axis, in a plane perpendicular to the rotation axis. By angling the dilution inlets in such a way, a better mix is achieved between dilution liquid (Continued)

and dispersed or refined organic material, which results in increased energy efficiency of the apparatus.

10 Claims, 5 Drawing Sheets

APPARATUS AND METHOD FOR DISPERSING OR REFINING OF ORGANIC MATERIAL, SUCH AS CELLULOSE FIBER AND ORGANIC WASTE

BACKGROUND AND SUMMARY

The present disclosure relates generally to apparatuses and methods for dispersing or refining of organic material, such as cellulose fiber and organic waste.

A target of dispersing and refining organic material such as cellulose fiber is to distribute contaminants in the cellulose fiber to a non-visible size. This is an economical method for elimination visible impurities in a cellulose fiber solution. Further, by such a method, strength properties of products produced from the fiber are developed.

Systems for dispersing and refining of organic material may be used in recycling mills. Such a system comprises an apparatus for dispersing or refining of the organic material, and possibly also a pre-treatment unit for preparing the incoming organic material solution and an after-treatment unit for handling the dispersed or refined organic material after being treated by the apparatus.

Such a system handling cellulose fiber receives incoming pulp comprising cellulose fibers suspended in water. The cellulose fiber of such an incoming pulp may e.g. come from waste paper. The incoming pulp may be dewatered and/or heated in a pre-treatment unit in order to achieve a better dispersing/refining result, before the pulp is fed into the apparatus for dispersing/refining. Further, the dispersed/refined pulp coming from the apparatus may be diluted in the after-treatment unit.

The applicant has a current apparatus for dispersing or refining organic material on the market. This apparatus comprises a rotor shaft extending along a rotation axis and a rotor connected to the rotor shaft so that when the rotor shaft is rotated, the rotor is rotated around the rotation axis. The apparatus further comprises a housing arranged around the rotor, the housing having an inlet for receiving the organic material and an outer wall. The housing is further arranged with a stator disc, and the rotor is arranged with a rotor disc, the rotor disc and the stator disc having material engaging elements, such as teeth. Further, the rotor disc and the stator disc are arranged opposite each other so that a gap is defined between them, whereby when the apparatus is in use, organic material introduced through the inlet will he fed by the rotating rotor through the gap between the rotor disc and stator disc and towards the outer wall of the housing. The housing further has an outlet arranged in the outer wall, through which outlet dispersed organic material is fed for transportation out of the apparatus, and a plurality of dilution inlets arranged in the outer wall through which dilution inlets dilution liquid is fed into the apparatus.

Such an apparatus has proven efficient for dispersing and refining organic material such as cellulose fiber. However, there is always an interest in improving the efficiency of such apparatuses in terms of e.g. increased dispersity, higher throughput and/or increased energy efficiency.

It is desirable to address at least some of the problems and issues outlined above. It is desirable to achieve increased energy efficiency in an apparatus for dispersing or refining. It is desirable to achieve a better mix between dilution liquid and dispersed organic material, which results in lower viscosity and in the end increased energy efficiency for the apparatus for dispersing or refining. It is desirable to achieve a higher throughput capacity, aka. dispersing capacity, without increasing dimension and energy consumption of the apparatus.

According to one aspect, an apparatus is provided for dispersing or refining organic material, such as cellulose fiber and organic waste. The apparatus comprises a rotor shaft extending along a rotation axis, and a rotor connected to the rotor shaft so that when the rotor shaft is rotated, the rotor is rotated around the rotation axis. The apparatus further comprises a housing arranged around the rotor, the housing having an inlet for receiving the organic material and an outer wall. Further, the housing is arranged with a stator disc, and the rotor is arranged with a rotor disc, the rotor disc and the stator disc having material engaging elements, such as teeth. Further, the rotor disc and the stator disc are arranged opposite each other so that a gap is defined between them, whereby when the apparatus is in use, organic material introduced through the inlet will be fed by the rotating rotor through the gap between the rotor disc and stator disc and towards the outer wall of the housing. The housing further has an outlet arranged in the outer wall, through which outlet dispersed organic material is fed out of the apparatus, and a number of dilution inlets arranged in the outer wall, through which dilution inlets dilution liquid is fed into the apparatus. Further, at least one of the number of dilution inlets is directed into the apparatus so that the at least one dilution inlet is angled in a plane substantially perpendicular to the rotation axis towards a radial of the rotation axis.

Tests by the applicant have shown that by angling the dilution inlets towards a radial of the rotation axis instead of them being arranged in the radial direction, as in prior art, a better mix is achieved between dilution liquid and organic material that leaves the outlet. A better mix results in lower viscosity and therefore a lower pressure drop in the apparatus. As a result, the energy consumption of the apparatus is lowered. Also, a higher flow through the apparatus can be achieved, i.e. the apparatus achieves a higher organic material processing capacity. Also, the risk that the organic material dissolved in water would plug up in the apparatus is lowered.

The inlet may be centrally arranged at or around the rotational axis X so that organic material introduced through the inlet is fed along the rotational axis towards the rotor and then by the rotor outwardly from the rotational axis and towards the outer wall, via the gap between the rotor disc and the stator disc. When the organic material is fed through the gap it will be subjected to shear forces, due to the material engaging elements of the rotor disc and the stator disc, as the rotor disc is rotated relative the stator disc. The at least one of the number of dilution inlets may be angled with any angle different from zero degrees, both positive and negative angles are possible, as long as the at least one dilution inlet is angled towards the radial at the position where it enters through the outer wall of the housing. The at least one dilution inlet is angled in a plane that is substantially perpendicular to the rotation axis. However, according to another embodiment, the dilution inlet is, apart from being angled in this plane, also angled towards the plane.

According to an embodiment, an angle of the at least one of the number of dilution inlets towards the radial of the rotation axis is 10-60 degrees, more preferably 20-50 degrees, most preferably 25-45 degrees. Such angles have proven to give the best mix between dilution liquid and organic material when leaving through the outlet.

According to an embodiment, the outer wall of the housing defines an inner circumference with a radius from the rotation axis and the rotor defines an outer circumference with a radius from the rotation axis that is smaller than the radius of the inner circumference of the outer wall of the housing, whereby a dilution zone is defined between the outer circumference of the rotor and the inner circumference of the housing. Further, the number of dilution inlets are arranged to feed dilution liquid into the dilution zone, and the rotor is arranged to feed organic material in a peripheral direction along the dilution zone towards the outlet, when the apparatus is in use.

According to an embodiment, the at least one of the number of dilution inlets are directed into the apparatus so that it points partly along the peripheral feeding direction, when the apparatus is in use.

According to another embodiment, the outlet is arranged in the outer wall of the housing so that it is directed tangentially in the peripheral feeding direction.

According to another embodiment, the housing comprises a protrusion protruding from the outer wall and directed towards the rotor. The protrusion is arranged directly after the outlet in the peripheral feeding direction. By such a protrusion, the dilution zone is narrowed directly after the outlet in the feeding direction. Tests by the applicant have shown that by narrowing the dilution zone directly after the outlet, a better mix is achieved between dilution liquid and organic material that leaves the outlet. A better mix results in lower viscosity and therefore a lower pressure fall in the apparatus. As a result the energy consumption of the apparatus is lowered. Also, the risk of the organic material dissolved in water would plug up in the dilution zone is lowered.

According to a variant of the previous embodiment, the protrusion limits a radial cross-sectional area of the dilution zone with 30-60%, preferably around 50%. In other words, the distance between the protrusion and the outer circumference of the rotor is approximately half the distance between the inner circumference of the outer wall of the housing and the outer circumference of the rotor.

According to another variant of the previous embodiment, the protrusion is directed at least partly against the peripheral feeding direction. Hereby, less turbulence is achieved after the protrusion, compared to if the protrusion would have been directed partly along the peripheral feeding direction or perpendicular to the peripheral feeding direction.

According to another embodiment, the number of dilution inlets are at least two, preferably four.

According to another embodiment, the rotor disc extends into the dilution zone. In other words, as the rotor disc extends into the dilution zone, the diameter of the rotor disc from the rotation axis is greater than the diameter of the rotor. Hereby, the resulting dilution zone is made narrower compared to if the rotor disc would not extend into the dilution zone. This has proven to give a better mix between dilution liquid and organic material that leaves the outlet, when combined with angled dilution inlets and possibly also with a protrusion protruding from the outer wall of the housing directed towards the rotor.

According to another aspect, a method is provided for dispersing or refining organic material, such as cellulose fiber and organic waste, in an apparatus for dispersing or refining organic material. The apparatus comprises a rotor shaft extending along a rotation axis, a housing arranged around the rotor shaft, the housing having an inlet for receiving the organic material and an outer wall, and a rotor arranged inside the housing, the rotor being connected to the rotor shaft. Further, the housing is arranged with a stator disc, and the rotor is arranged with a rotor disc at a periphery of the rotor. The rotor disc and the stator disc have material-engaging elements such as teeth, and the rotor disc and the stator disc are arranged opposite each other so that a gap is defined between them. The method comprises bringing the rotor shaft to rotate so that the rotor is rotated around the rotation axis, introducing organic material through the inlet, feeding, by the rotating rotor, the organic material introduced through the inlet through the gap between the rotor disc and stator disc and towards the outer wall of the housing so that as the organic material is fed through the gap it is subjected to shear forces as the rotor disc is rotated relative to the stator disc. The method further comprises feeding, through a number of dilution inlets arranged in the outer wall, dilution liquid into the apparatus so that dilution liquid is mixed with the sheared organic material, and feeding, by the rotating rotor, the mix of dilution liquid and organic material through an outlet arranged in the outer wall. Further, at least one of the number of dilution inlets is directed into the apparatus so that it is angled in a plane substantially perpendicular to the rotation axis towards a radial of the rotation axis.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Figure 1:
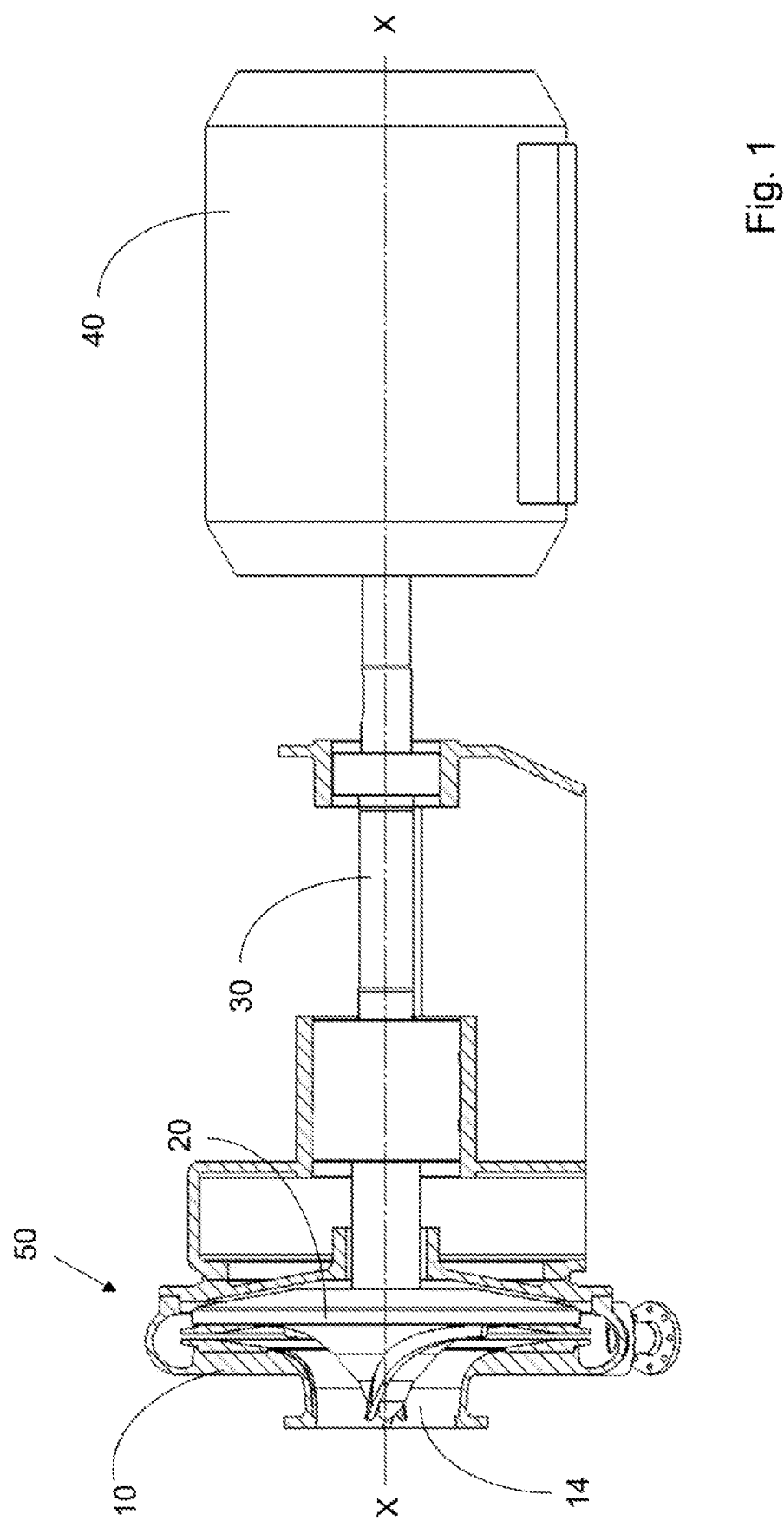
FIG. 1 is a side view of a system including an apparatus for dispersing and refining and a motor for driving the apparatus, according to an embodiment.
Figure 2:
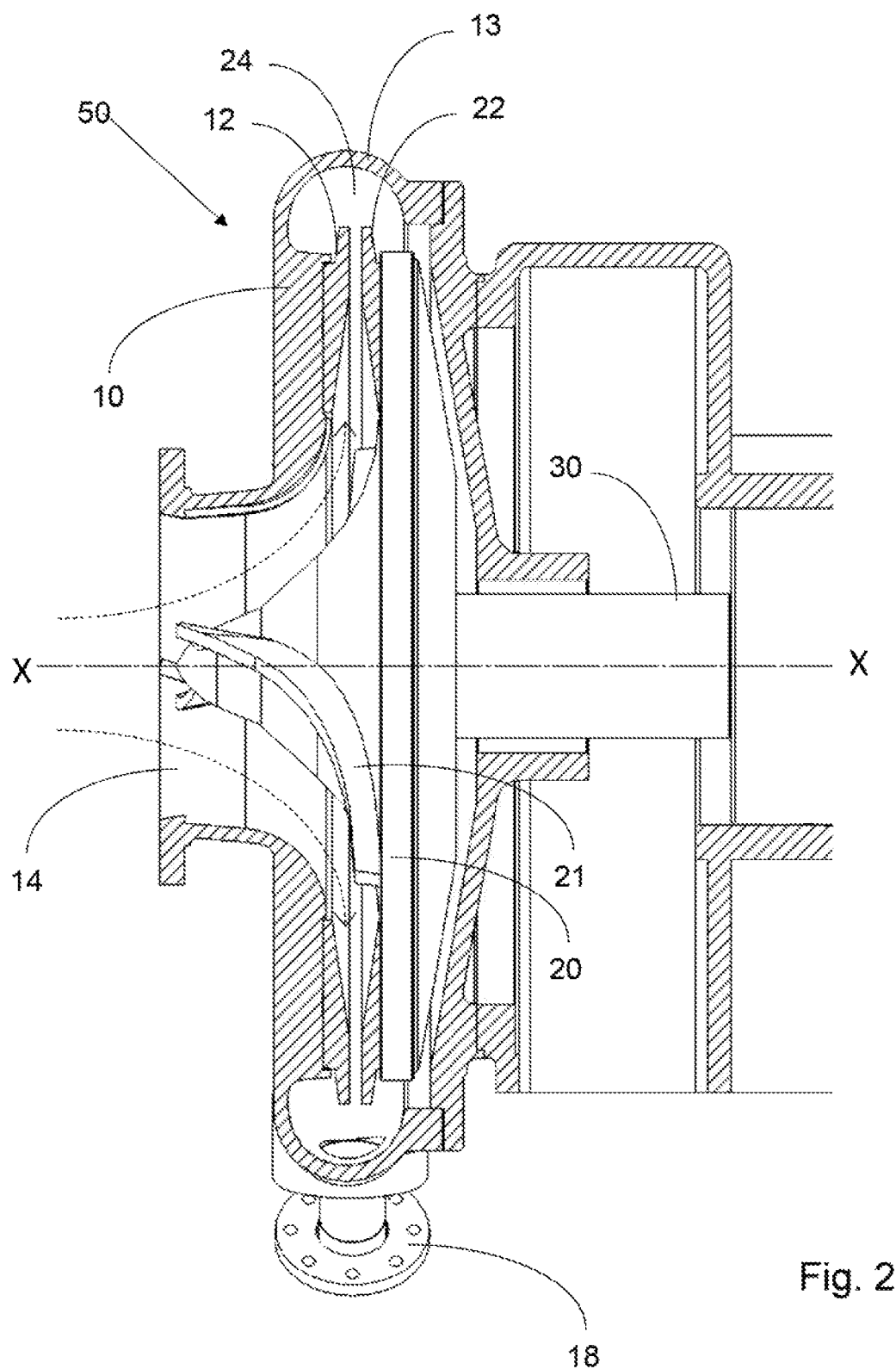
FIG. 2 is a close-up side view of the apparatus of FIG. 1.

In the following, an exemplary embodiment of the present invention is described with respect to FIGS. 1-4. FIGS. 1-4 describe an apparatus 50 for dispersing or refining organic material such as cellulose fiber or organic waste. The apparatus 50 comprises a shaft 30. The shaft 30 is driven to rotate around a rotation axis X by a motor 40. The apparatus 50 further comprises a rotor 20 arranged onto the shaft 30 so that when the shaft 30 is rotated, the rotor 20 also rotates around the rotation axis X. The rotor 20 may be arranged symmetrically around the rotation axis X. According to the shown embodiment, the rotor 20 has the form of an impeller having one or more vanes 21, in this example two vanes (see FIG. 3). However, other forms may apply.

The apparatus 50 further comprises a housing 10 arranged around the rotor 20 and also around a part of the rotor shaft 30. In other words, the rotor 20 is arranged inside the housing 10. The housing 10 has an outer wall 13. The housing 10 further has an inlet 14 for receiving the organic material. The inlet 14 may be arranged symmetrically around the rotation axis X, however, other forms may apply. Further, the rotor 20 may be arranged such that it tapers off towards the inlet 14. In other words, the rotor 20 enlarges radially from the inlet and in the direction along the rotation axis away from the inlet 14. Also, the housing 10 may enlarge from its inlet 14 and at least a part along the rotation axis X. Inside the housing, a stator disc 12, aka. fixed disc is arranged. The stator disc 12 may extend substantially perpendicular to the rotation axis X. Further, the rotor 20 is arranged with a rotor disc 22 that is arranged substantially parallel to the stator disc 12. Therefore, the rotor disc 22, as well as the stator disc 12 may be arranged substantially perpendicular to the rotation axis X.

Further, the rotor disc 22 and the stator disc 12 are arranged opposite each other so that a gap is defined between them. When the apparatus is in use and the rotor 20 is rotated by the rotation shaft, organic material introduced through the inlet 14 will be fed by the rotating rotor 20 through the gap formed between the rotor disc 22 and stator disc 12 and towards the outer wall 13 of the housing 10, see the dotted arrows of FIG. 1.

Figure 4:
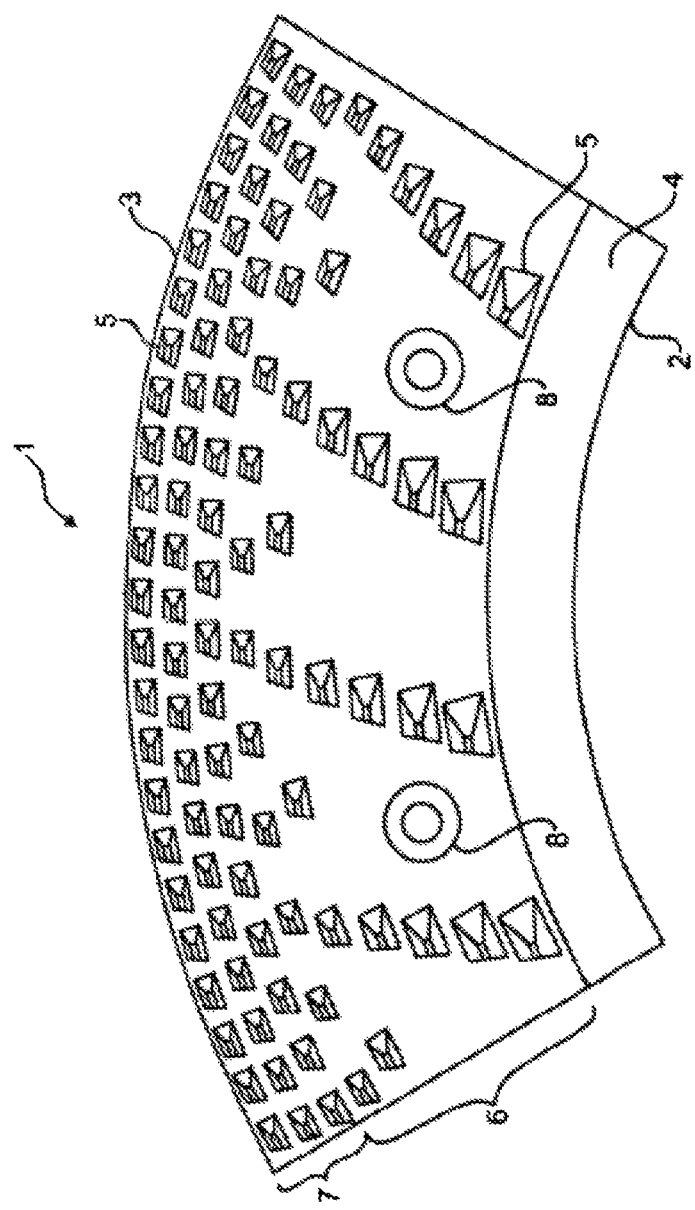
FIG. 4 is a front view of an example of a segment of a rotor disc or stator disc that can be used in the present invention.

At the gap, at the sides of the rotor disc 22 and the stator disc 12 facing each other, the rotor disc and the stator disc have material engaging elements 5 (see FIG. 4), by which the organic material introduced through the inlet 14 are subjected to shear forces as the rotor disc 22 rotates relative the stator disc 12. FIG. 4 shows an annular segment 1 of a stator disc 12 or a rotor disc 22. A plurality of such annular segments are put together to form a stator disc or rotor disc. The material engaging elements 5 are arranged in a certain pattern on the segment 1. The material engaging elements 5 may be a plurality of protruding parts, protruding from the disc towards the other disc. The material engaging elements 5 may be teeth arranged e.g. in a knob pattern with different spaces between the teeth. Alternatively, the material engaging elements 5 may be protrusions arranged e.g. such that they form a square pattern or trapeze pattern between the protrusions. The segment further has an inner edge 2 and an outer edge 3. The segment 1 further has a base 4 on which the material engaging elements 5 are fixed. The material engaging elements 5 may be arranged in concentric rows, which allow the material engaging elements 5 of a full disc to run between the material engaging elements of an opposed disc when rotating in respect of the opposed disc. Examples of segments are shown in European patent EP2508670 of the applicant. As seen in the example of FIG. 4, the distance between material engaging elements 5 of an inner portion 6 of a segment 1 is according to an embodiment generally greater than a distance between material engaging elements 5 of an outer portion 7 of the segment I. The segment 1 further has holes 8 that allow the segment 1 to be fixed to the rotor 20 or housing 10.

Figure 3:
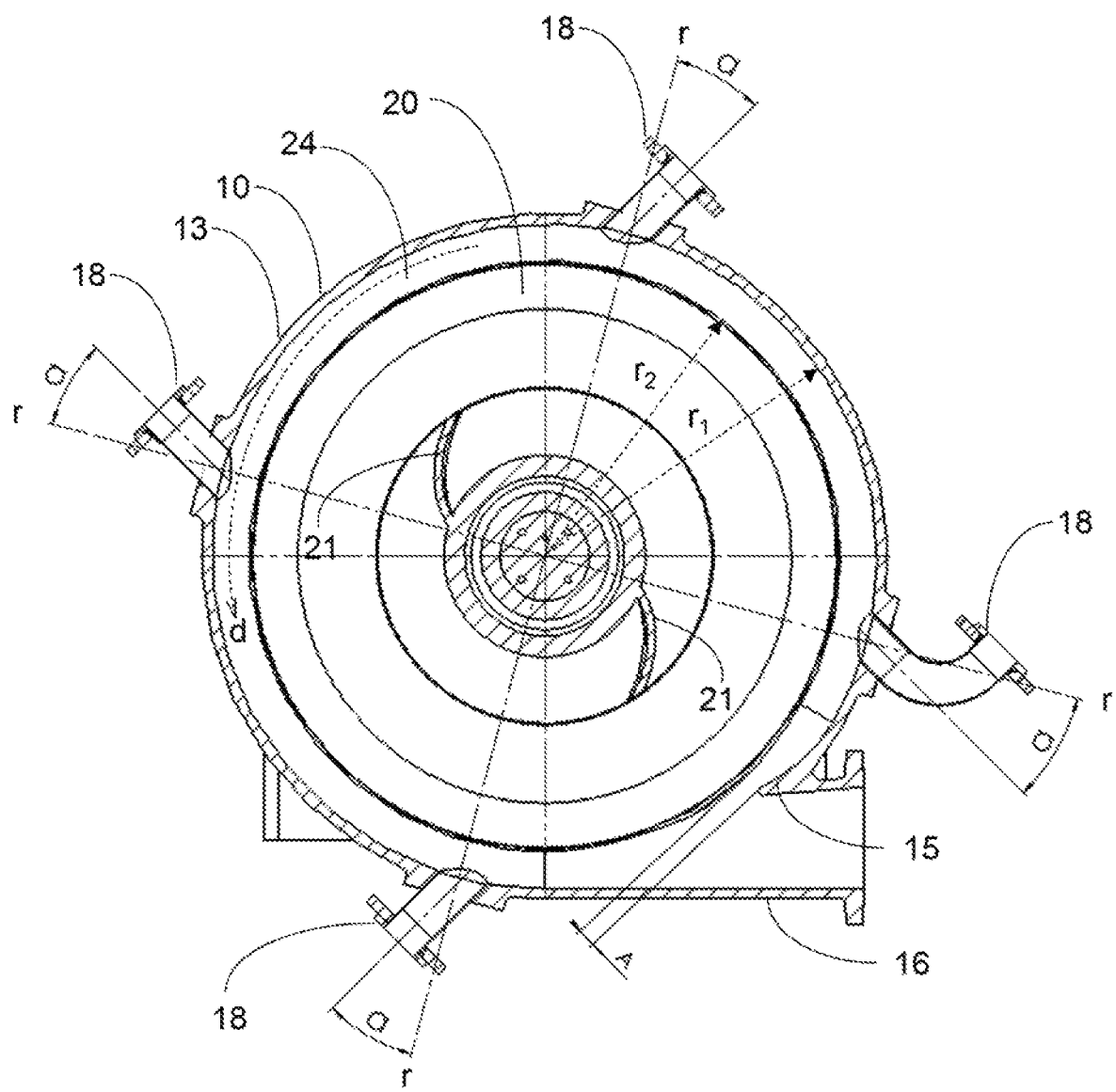
FIG. 3 is a cross-sectional view of the apparatus of FIG. 1, taken perpendicular to the axial direction of the apparatus.

Further, as seen e.g. in FIG. 3, the outer wall 13 of the housing 10 defines an inner circumference with a radius $r_1$ from the rotation axis X. Further, the rotor 20 defines an outer circumference with a radius $r_2$ from the rotation axis X. The radius $r_2$ of the rotor is smaller than the radius $r_1$ of the inner circumference of the outer wall of the housing 10. Between the outer circumference of the rotor 20 and the inner circumference of the housing 10 a hollow space is formed, called a dilution zone 24, into which the organic material is fed after it has been dispersed by the material engaging elements of the rotor disc 22 and the stator disc 10.

In the outer wall 13, an outlet 16 is arranged. The rotor 20 is arranged to feed organic material in the dilution zone 24 in a peripheral direction d (see FIG. 3) along the dilution zone 24 towards the outlet 16, through which outlet 16 dispersed organic material is fed for transportation out of the apparatus 50. The outlet 16 is preferably arranged in the outer wall 13 of the housing 10 so that it is directed tangentially in the peripheral feeding direction d.

Further, the housing 10 has a number of dilution inlets 18 arranged in the outer wall 13. In the shown embodiment there are four dilution inlets 18. Through the dilution inlets 18, dilution liquid is fed into the apparatus to be mixed with the dispersed organic material in the dilution zone. The dispersed organic material is mixed with dilution liquid in order to create a mix that has lower viscosity, i.e. flows better through the apparatus and any after-treatment units, and thereby is less energy consuming. The dilution liquid is normally water, however other liquids may also be used. According to the invention, at least one of the dilution inlets 18 is directed into the apparatus so that it is angled in a plane substantially perpendicular to the rotation axis X towards a radial r of the rotation axis X. Hereby a better mix is achieved between dilution liquid and organic material compared to when the dilution inlets are parallel to the radial r. According to an embodiment, the at least one dilution inlet 18 lies in the plane substantially perpendicular to the rotation axis X. According to another embodiment, the angle a of the at least one of the dilution inlets 18 towards the radial r of the rotation axis X is 10-60 degrees, more preferably 20-50 degrees, most preferably 25-45 degrees. As seen in FIG. 3, this embodiment has three straight dilution inlets 18 and one bent dilution inlet 18 (down to the right in FIG. 3). The shown bent dilution inlet is bent for practical reasons, in order not to physically interfere with the outlet. What is common to the angled dilution inlets is that they are angle towards the radial r at the position where they enter the outer wall 13.

According to another embodiment, the housing 10 comprises a protrusion 15 protruding from the outer wall 13. The protrusion is directed towards the rotor 20. Further, the protrusion 15 is arranged directly after the outlet 16 in the peripheral feeding direction d. The distance between the protrusion and the outer circumference of the rotor 20 is called "A" in FIG. 3. The distance A is smaller than $r_1$-$r_2$. According to an embodiment, the protrusion limits a radial cross-sectional area of the dilution zone 24 with 30-60%, preferably around 50%. According to another embodiment, the protrusion 15 is directed at least partly against the peripheral feeding direction d.

According to another embodiment, the rotor disc 22 extends into the dilution zone 24. This means that the radius of the rotor disc 22 from the rotation axis X is greater than the radius $r_2$ of the rotor 20. Also, the stator disc 12 may enter into the dilution zone 24. This can be seen in FIG. 2. By one or both discs entering the dilution zone, an extra mixing is achieved in the organic material/dilution liquid mix of the dilution zone 24.

Figure 5:
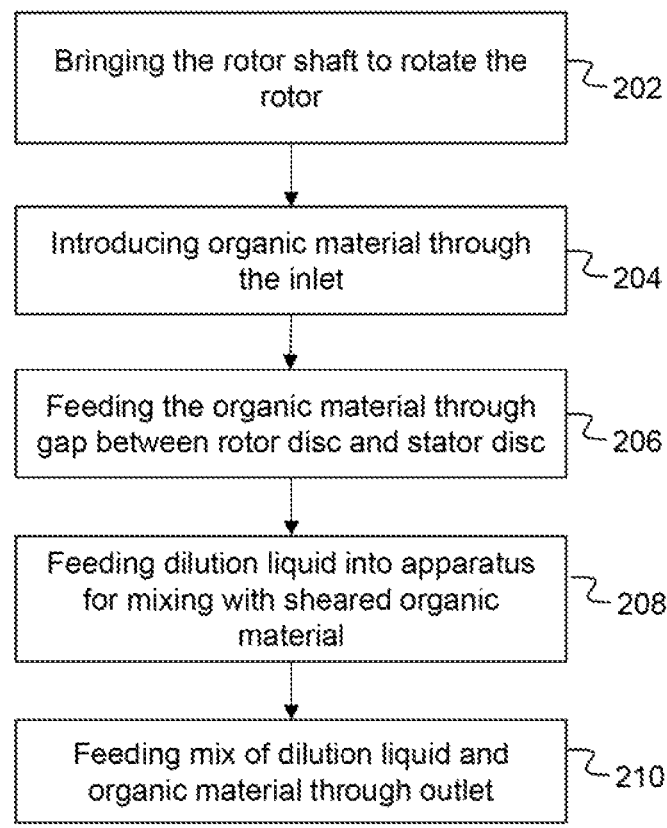
FIG. 5 is a flow chart of a method according to an embodiment.

FIG. 5 shows a method for dispersing or refining organic material in an apparatus as described in any of the embodiments above. The method comprises bringing 202 the rotor shaft 30 to rotate so that the rotor 20 is rotated around the rotation axis X, introducing 204 organic material through the inlet 14, and feeding 206, by the rotating rotor 20, the organic material introduced through the inlet 14 through the gap between the rotor disc 22 and stator disc 12 and towards the outer wall 13 of the housing 10 so that as the organic material is fed through the gap it is subjected to shear forces as the rotor disc 22 is rotated relative to the stator disc 12. The method further comprises feeding 208, through a number of dilution inlets 18 arranged in the outer wall 13, dilution liquid into the apparatus so that dilution liquid is mixed with the sheared organic material, and feeding 210, by the rotating rotor 20, the mix of dilution liquid and organic material through an outlet 16 arranged in the outer wall 13.

In another aspect, an apparatus 50 is described for dispersing or refining organic material, such as cellulose fiber and organic waste. The apparatus comprises a rotor shaft 30 extending along a rotation axis X, a housing 10 arranged around the rotor shaft 30, the housing having an inlet 14 for receiving the organic material and an outer wall 13, and a rotor 20 arranged inside the housing 10. The rotor 20 is connected to the rotor shaft 30 so that when the rotor shaft is rotated, the rotor 20 is rotated around the rotation axis X. The housing 10 is further arranged with a stator disc 12, and the rotor 20 is arranged with a rotor disc 22, the rotor disc and the stator disc having material engaging elements, such as teeth 5. Further, the rotor disc 22 and the stator disc 12 are arranged opposite each other so that a gap is defined between them, whereby when the apparatus is in use, organic material introduced through the inlet 14 will be fed by the rotating rotor 20 through the gap between the rotor disc 22 and stator disc 12 and towards the outer wall 13 of the housing 10. The housing 10 further has an outlet 16 arranged in the outer wall 13, through which outlet dispersed organic material is fed for transportation out of the apparatus. The housing 10 comprises a protrusion 15 protruding from the outer wall 13 and directed towards the rotor 20. The protrusion 15 is arranged directly after the outlet 16 in the peripheral feeding direction d. Such a protrusion limits the radial cross-section of the volume in which dispersed organic material is fed as in a centrifuge. By such a protrusion arranged directly after the outlet 16 in the feeding direction, a pressure fall in the apparatus is lowered compared to no such protrusion. As a result the energy consumption of the apparatus is lowered.

According to a special case of this aspect, a number of dilution inlets 18 are arranged in the outer wall 13, through which dilution inlets dilution liquid is fed into the apparatus. At least one of the dilution inlets may be angled in a plane substantially perpendicular to the rotation axis, towards a radial of the rotation axis X.

According to another special case of this aspect, the outer wall 13 of the housing 10 defines an inner circumference with a radius $r_1$ from the rotation axis X. The rotor 20 defines an outer circumference with a radius $r_2$ from the rotation axis X that is smaller than the radius $r_1$ of the inner circumference of the outer wall of the housing 10. A dilution zone 24 is defined between the outer circumference of the rotor 20 and the inner circumference of the housing 10. The number of dilution inlets 18 are arranged to feed dilution liquid into the dilution zone 24. The rotor 20 is arranged to feed organic material in a peripheral direction d along the dilution zone 24 towards the outlet 16, when the apparatus is in use According to another special case of this aspect, the protrusion 15 limits a radial cross-sectional area of the dilution zone 24 with 30-60%, preferably around 50%.

According to another special case of this aspect, the protrusion 15 is directed at least partly against the peripheral feeding direction d.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

The invention claimed is:

1. An apparatus for dispersing or refining organic material the apparatus comprising:
   a rotor shaft extending along a rotation axis;
   a rotor connected to the rotor shaft so that when the rotor shaft is rotated, the rotor is rotated around the rotation axis,
   a housing arranged around the rotor, the housing having an inlet for receiving the organic material and an outer wall;
   wherein the housing is further arranged with a stator disc, and the rotor is arranged with a rotor disc, the rotor disc and the stator disc having material engaging elements, and the rotor disc and the stator disc being arranged opposite each other so that a gap is defined between them, whereby when the apparatus is in use, organic material introduced through the inlet will be fed by the rotating rotor through the gap between the rotor disc and stator disc to a dilution zone and towards the outer wall of the housing,
   the housing further having:
   an outlet arranged in the outer wall, through which outlet dispersed organic material is fed for transportation out of the apparatus, a flow path for organic material being defined by the inlet, the gap, the dilution zone, and the outlet in succession, and
   at least one dilution inlet arranged in the flow path downstream of the gap, in the outer wall and through which at least one dilution inlet dilution liquid is fed into the dilution zone, wherein the at least one dilution inlet is directed into the apparatus so that an axis of the at least one dilution inlet at an outlet of the at least one dilution inlet is angled in a plane that is substantially perpendicular to the rotation axis, towards a radial of the rotation axis.

2. The apparatus according to claim 1, wherein an angle of the at least one dilution inlet towards the radial of the rotation axis is 10-60 degrees.

3. The apparatus according to claim 1, wherein the outer wall of the housing defines an inner circumference with a radius from the rotation axis and the rotor defines an outer circumference with a radius from the rotation axis that is smaller than the radius of the inner circumference of the outer wall of the housing, whereby a the dilution zone is defined between the outer circumference of the rotor and the inner circumference of the housing, wherein the at least one dilution inlet are arranged to feed dilution liquid into the dilution zone, wherein the rotor is arranged to feed organic material in a peripheral direction along the dilution zone towards the outlet, when the apparatus is in use.

4. The apparatus according to claim 3, wherein the at least one dilution inlet of the at least one dilution inlet is directed into the apparatus so that it points partly along the peripheral feeding direction, when the apparatus is in use.

5. The apparatus according to claim 3, wherein the outlet is arranged in the outer wall of the housing so that it is directed tangentially in the peripheral feeding direction.

6. The apparatus according to claim 3, wherein the housing comprises a protrusion protruding from the outer wall and directed towards the rotor, the protrusion being arranged directly after the outlet in the peripheral feeding direction.

7. The apparatus according to claim 6, wherein the protrusion limits a radial cross-sectional area of the dilution zone with 30-60%.

8. The apparatus according to claim 6, wherein the protrusion is directed at least partly against the peripheral feeding direction.

9. The apparatus according to claim 1, wherein the at least one dilution inlet includes at least two dilution inlets.

10. The apparatus according to claim 3, wherein the rotor disc extends into the dilution zone.

* * * * *